(12) United States Patent
Bindl et al.

(10) Patent No.: US 11,413,960 B2
(45) Date of Patent: Aug. 16, 2022

(54) POWER SHIFT TRANSMISSION WITH ELECTRIC POWER ASSIST

(71) Applicant: Deere & Company, Moline, IL (US)

(72) Inventors: Reginald M. Bindl, Bettendorf, IA (US); Eric Vilar, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 522 days.

(21) Appl. No.: 16/510,805

(22) Filed: Jul. 12, 2019

(65) Prior Publication Data

US 2021/0008979 A1     Jan. 14, 2021

(51) Int. Cl.

| | |
|---|---|
| *B60K 25/02* | (2006.01) |
| *B60K 6/387* | (2007.10) |
| *B60K 6/485* | (2007.10) |
| *B60K 6/36* | (2007.10) |
| *B60K 6/547* | (2007.10) |

(Continued)

(52) U.S. Cl.
CPC ............... *B60K 25/02* (2013.01); *B60K 6/36* (2013.01); *B60K 6/387* (2013.01); *B60K 6/485* (2013.01); *B60K 6/547* (2013.01); *B60K 2025/022* (2013.01); *B60Y 2200/92* (2013.01); *F16H 3/093* (2013.01); *F16H 2003/0818* (2013.01)

(58) Field of Classification Search
CPC .......... B60K 25/02; B60K 6/36; B60K 6/387; B60K 6/485; B60K 6/547; F16H 3/093; F16H 2003/0818
USPC ...................................... 192/48.8
See application file for complete search history.

(56) References Cited

U.S. PATENT DOCUMENTS 7,249,537 B2 *  7/2007  Lee ...................... B60W 10/113
                                                           74/661
7,914,416 B2     3/2011  Maguire et al.
(Continued)

FOREIGN PATENT DOCUMENTS

DE      102009020177 A1    12/2009
DE      102014203287 A1     9/2014
(Continued)

OTHER PUBLICATIONS

German Search Report issued in counterpart application No. 102020208515.3 dated Feb. 16, 2021 (12 pages).

*Primary Examiner* — Tinh Dang
(74) *Attorney, Agent, or Firm* — Michael Best & Friedrich LLP

(57) ABSTRACT

A power shift transmission includes an input shaft and a gear housing including a gear assembly disposed therein. The gear assembly is driven by the input shaft. The transmission also includes an output shaft rotated by the gear assembly. The transmission also includes an auxiliary shaft extending through a portion of the gear housing. The auxiliary shaft is rotated by an internal combustion engine. The transmission also includes a clutch assembly movable from a disengaged position to an engaged position. The clutch assembly includes a first clutch portion coupled to the input shaft and a second clutch portion coupled to the auxiliary shaft. The second clutch portion transmits rotational force to the first clutch portion only with the clutch assembly in the engaged position. The transmission also includes an electric motor including an electric motor shaft in geared relationship with the first clutch portion.

19 Claims, 9 Drawing Sheets

(51) Int. Cl.
    *F16H 3/093*     (2006.01)
    *F16H 3/08*     (2006.01)

(56) References Cited

U.S. PATENT DOCUMENTS

| | | | |
|---|---|---|---|
| 8,113,077 B2* | 2/2012 | Ishii | F16H 37/043 |
| | | | 74/335 |
| 8,771,139 B2* | 7/2014 | Ideshio | B60L 15/2009 |
| | | | 477/8 |
| 8,801,557 B2 | 8/2014 | Park | |
| 9,540,006 B2 | 1/2017 | Yoshizawa et al. | |
| 9,568,082 B2* | 2/2017 | Yang | B60K 6/387 |
| 9,751,518 B2* | 9/2017 | Dalum | B60K 25/06 |
| 11,235,753 B2* | 2/2022 | Nishihira | B60W 10/04 |
| 2011/0174557 A1 | 7/2011 | Tanba et al. | |
| 2011/0179905 A1 | 7/2011 | Tanba et al. | |
| 2016/0040394 A1 | 2/2016 | Monden et al. | |
| 2016/0305510 A1* | 10/2016 | Kato | F16H 3/66 |

FOREIGN PATENT DOCUMENTS

| | | |
|---|---|---|
| DE | 102016226097 A1 | 7/2017 |
| EP | 1321326 B1 | 7/2006 |

* cited by examiner

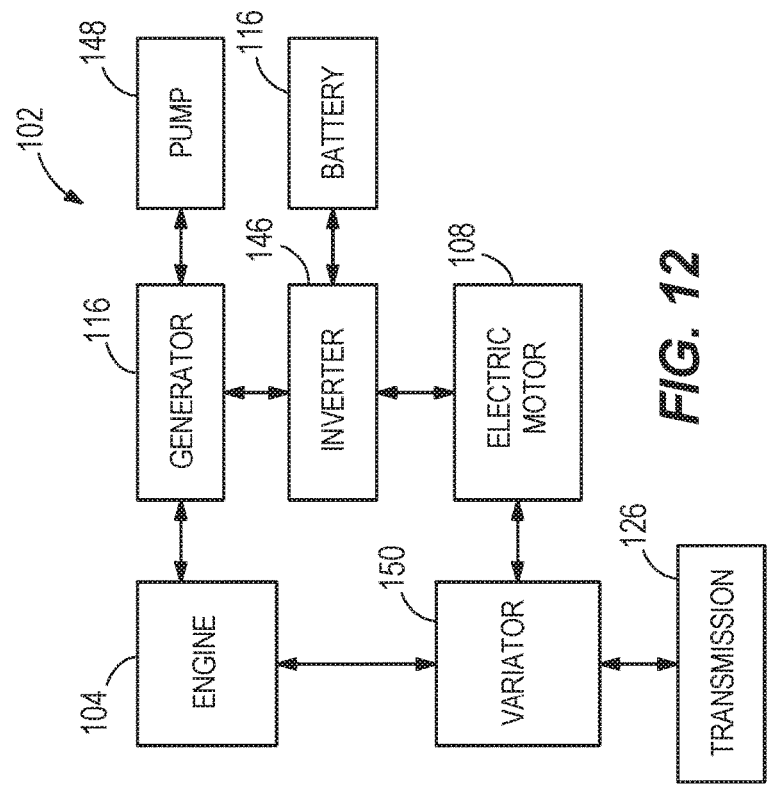
FIG. 12
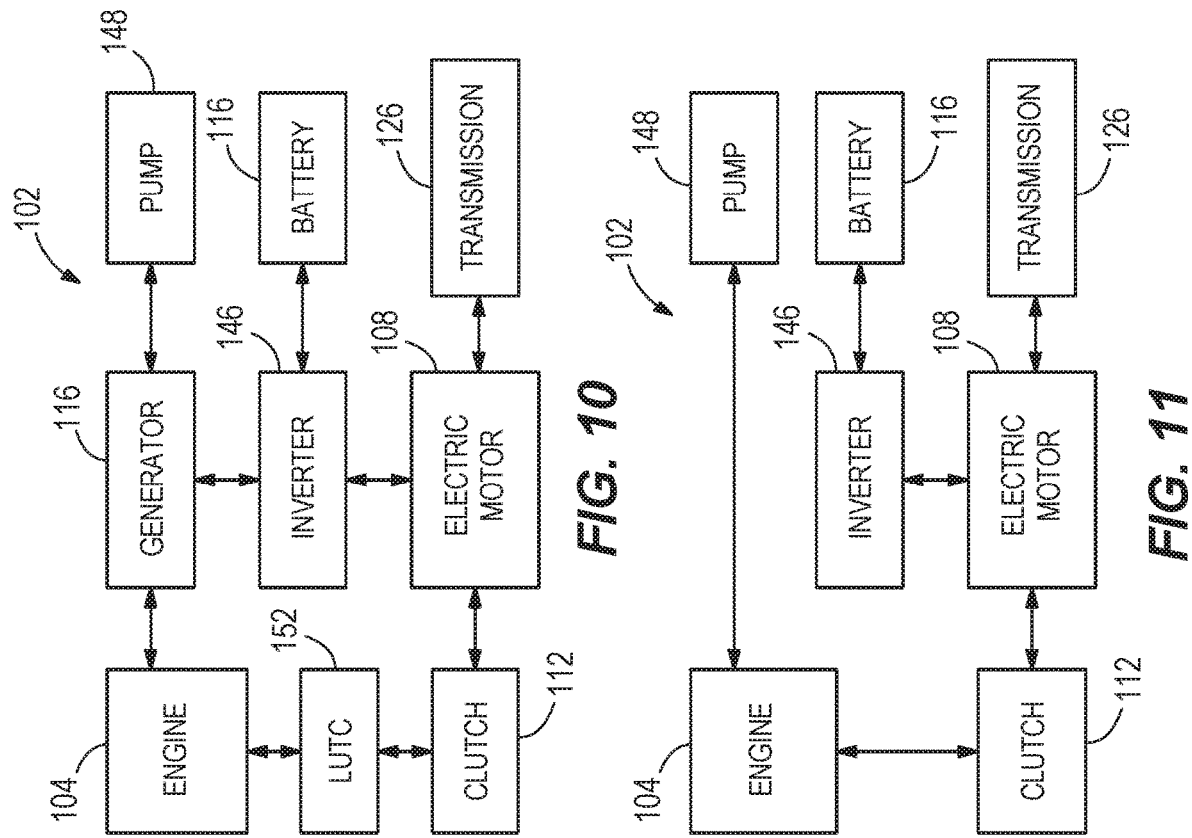
FIG. 10
FIG. 11 ated with a gear housing 106. An electric motor 108 also

POWER SHIFT TRANSMISSION WITH ELECTRIC POWER ASSIST

BACKGROUND

The present disclosure relates to a power shift transmission for use in a work vehicle.

Automatic transmissions often include a hydraulic torque converter between the engine and the input shaft of the gear assembly. The hydraulic torque converter can include a lock-up clutch, making the hydraulic torque converter a lock-up hydraulic torque converter. Regardless of type, a hydraulic torque converter allows the engine to spin and produce torque while the vehicle is at rest and the input shaft is not rotated.

SUMMARY

The overall efficiency of a torque converter power shift transmission used in work vehicles is dependent upon the torque converter function. Typically, torque converters are not very efficient at transferring engine power into the gear assembly. These components, therefore, generate considerable amounts of heat. To improve the performance of a torque converter, others have utilized a lock-up feature that selectively directly connects the engine output to the transmission input by bypassing the torque converter function entirely.

It would be advantageous, therefore, to replace the lock-up torque converter in a work vehicle with a clutch assembly and electric motor. The electric motor could be useful at start-up or other conditions to provide torque that supplements or replaces torque that would otherwise need to be provided by the engine, allowing the engine to operate with lower torque demand.

In one aspect, the disclosure provides a power shift transmission including an input shaft and a gear housing including a gear assembly disposed therein. The gear assembly is driven by the input shaft. The transmission also includes an output shaft rotated by the gear assembly. The transmission also includes an auxiliary shaft extending through a portion of the gear housing. The auxiliary shaft is rotated by an internal combustion engine. The transmission also includes a clutch assembly movable from a disengaged position to an engaged position. The clutch assembly includes a first clutch portion coupled to the input shaft and a second clutch portion coupled to the auxiliary shaft. The second clutch portion transmits rotational force to the first clutch portion only with the clutch assembly in the engaged position. The transmission also includes an electric motor including an electric motor shaft in geared relationship with the first clutch portion.

In another aspect, the disclosure provides a power shift transmission including an input shaft. A gear assembly is driven by the input shaft. An output shaft is rotated by the gear assembly. A clutch assembly is coupled to the input shaft. The clutch assembly is movable from a disengaged position to an engaged position. An electric motor includes an electric motor shaft in geared relationship with the clutch assembly. Both with the clutch assembly in the disengaged position and with the clutch assembly in the engaged position, the electric motor shaft rotates with the input shaft. An internal combustion engine includes an engine shaft rotating the input shaft only with the clutch assembly in the engaged position.

Other aspects of the disclosure will become apparent by consideration of the detailed description and accompanying drawings.

BRIEF DESCRIPTION OF THE DRAWINGS

FIG. 10 is a block diagram schematically representing the connections of various components of a power shift transmission according to another embodiment of the disclosure.

FIG. 11 is a block diagram schematically representing the connections of various components of a power shift transmission according to another embodiment of the disclosure.

FIG. 12 is a block diagram schematically representing the connections of various components of a power shift transmission according to another embodiment of the disclosure.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
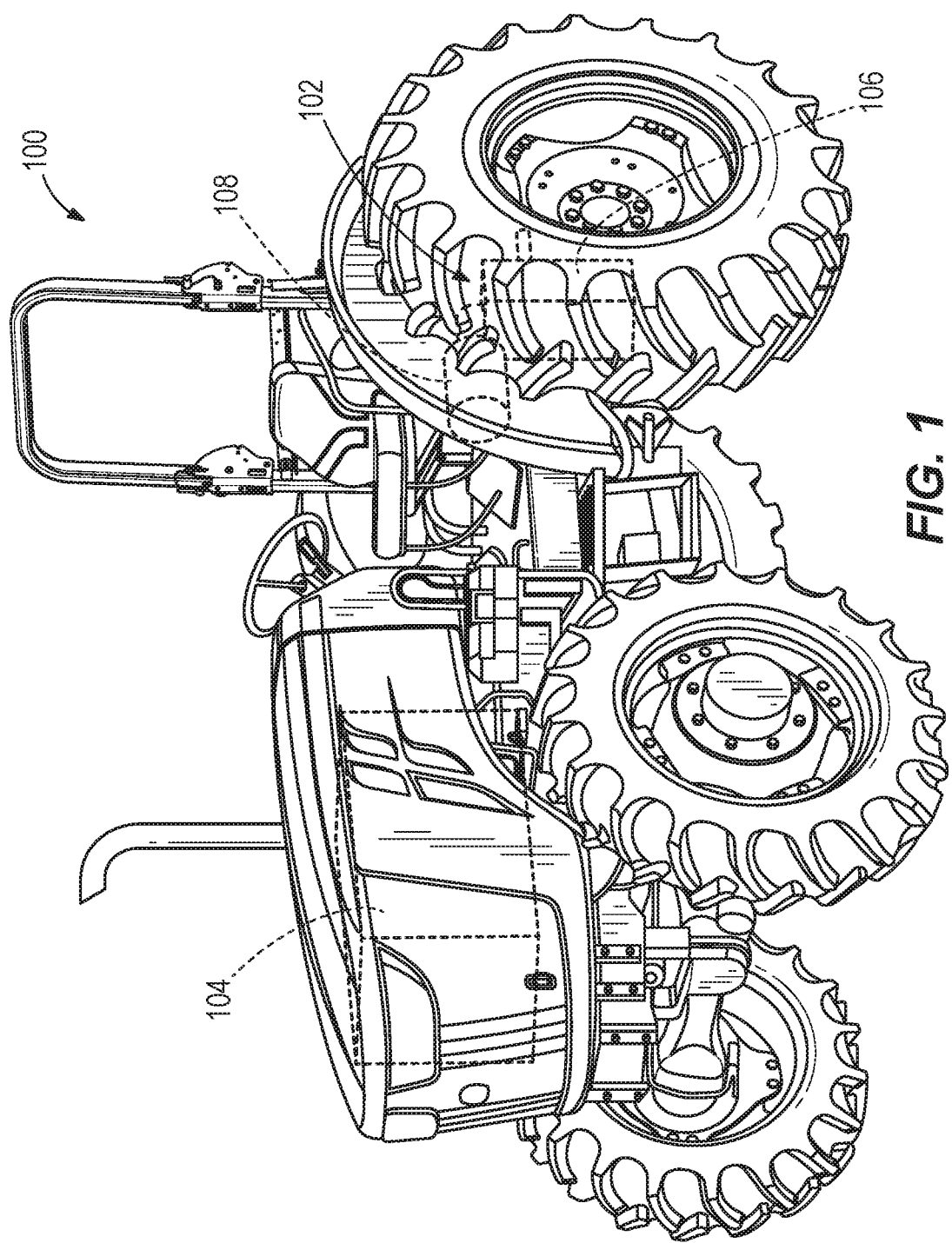
FIG. 1 is a perspective view of a work vehicle including a power shift transmission according to an embodiment of the disclosure.

FIG. 1 illustrates a work vehicle 100 including a power shift transmission 102 according to an embodiment of the disclosure. The work vehicle 100 is illustrated as a tractor; however, the work vehicle 100 may be, for example, a skid steer, a riding lawn mower, a backhoe, or other vehicle. A prime mover (e.g., an internal combustion engine) 104 supplies rotational force, or torque, to components associated with a gear housing 106. An electric motor 108 also supplies torque to the components associated with the gear housing 106.

Figure 2:
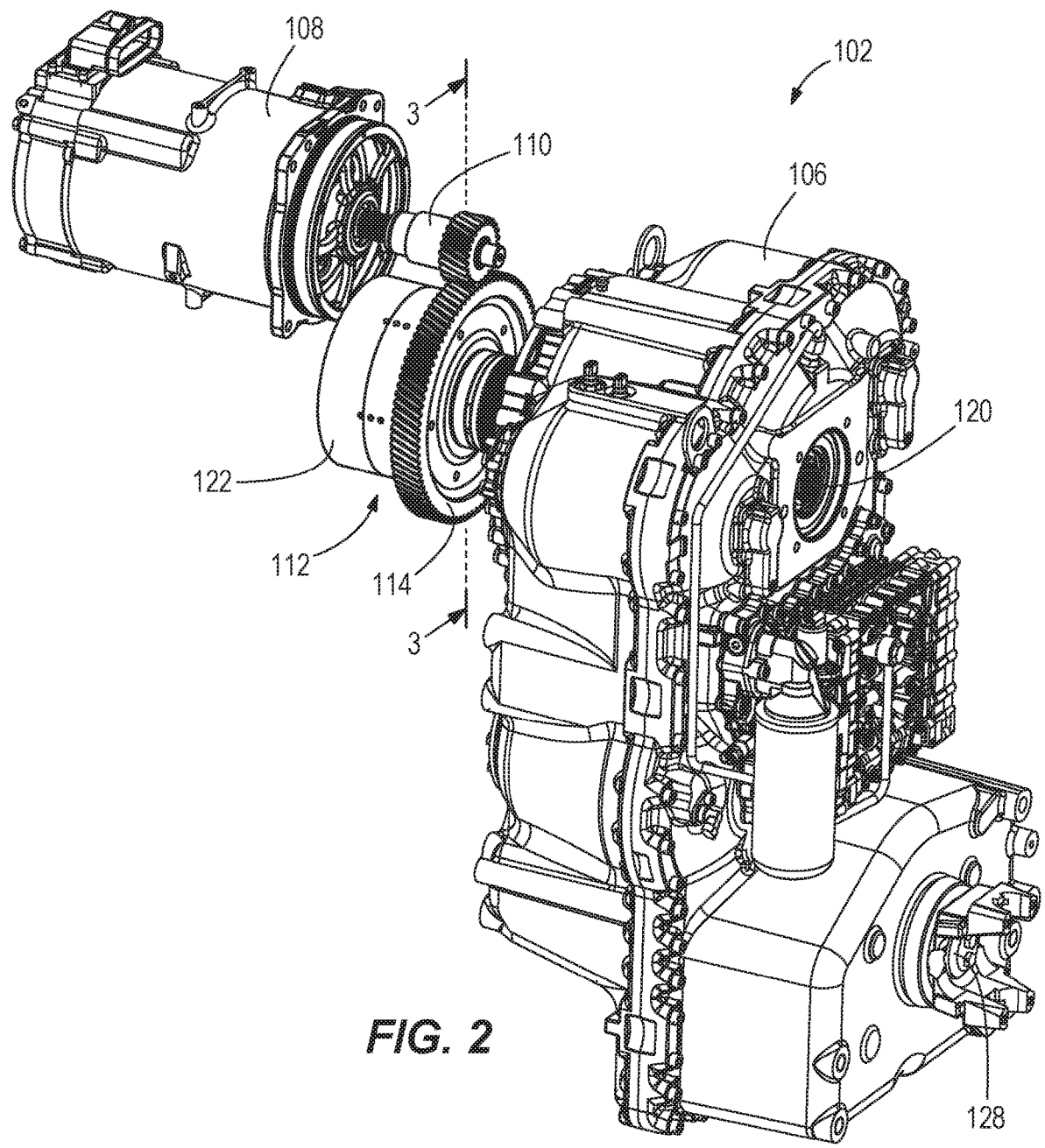
FIG. 2 is a perspective view of the power shift transmission included with the work vehicle of FIG. 1.

With reference to FIG. 2, the power shift transmission 102 is shown with the electric motor 108 including an electric motor shaft 110 and a clutch assembly 112. A first clutch portion 114 of the clutch assembly 112 is shown in geared relationship with the electric motor shaft 110.

Figure 3:
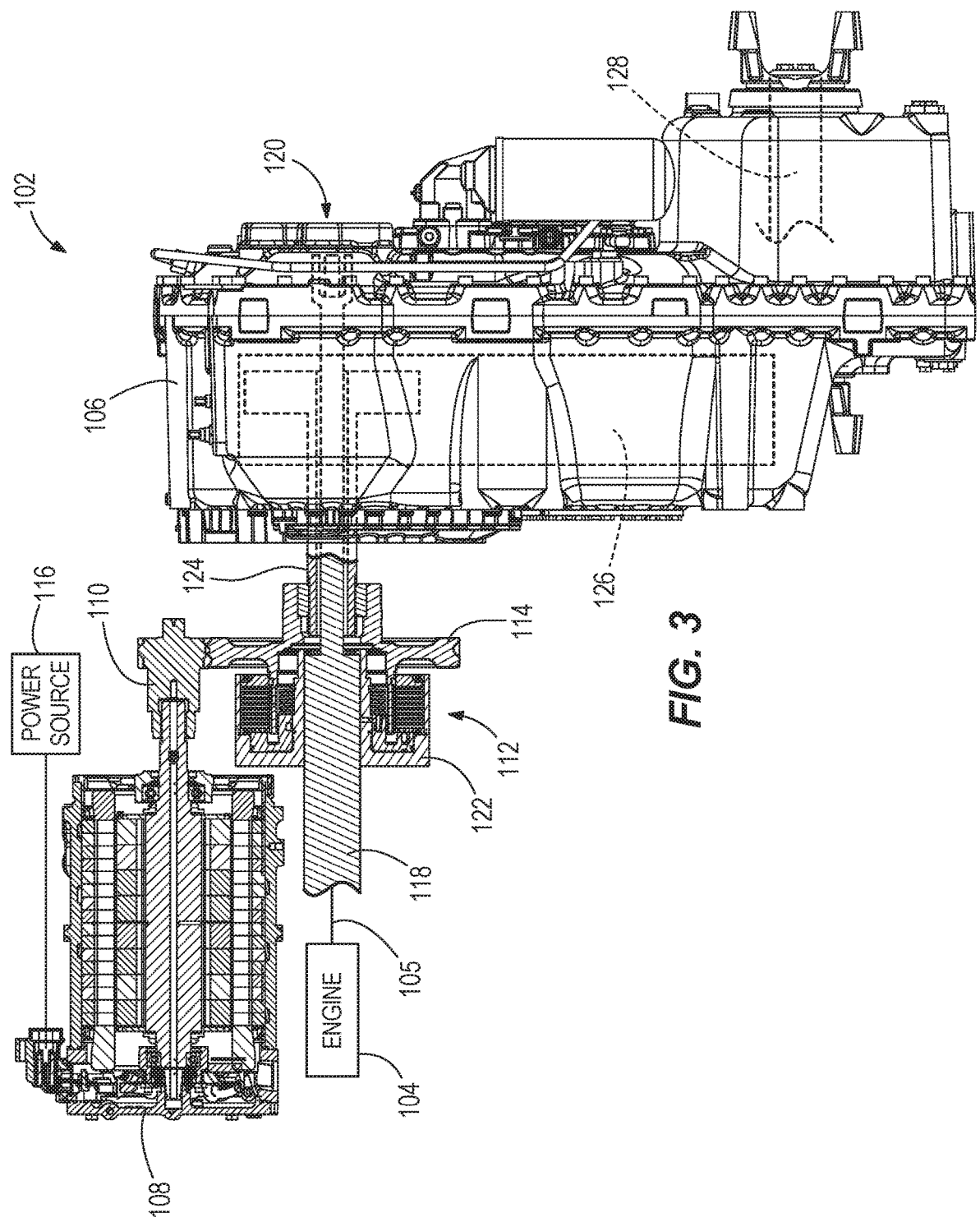
FIG. 3 is a side elevation view of the power shift transmission of FIG. 2 with the electric motor and clutch assembly shown in cross-section.

With reference to FIG. 3, the power shift transmission 102 is shown with a power source 116 (shown schematically) electrically coupled with the electric motor 108. The power source 116 may include, for instance, a battery, a generator, an inverter, some combination thereof, or the like.

Also shown in FIG. 3, the engine 104 (shown schematically) is coupled to an auxiliary shaft 118 such that the auxiliary shaft 118 is rotated, either directly or indirectly, by the engine 104. For instance, the engine 104 includes an engine shaft 105, such as a crankshaft or a driveshaft, that may be coupled directly to the auxiliary shaft 118 such that the engine shaft 105 and the auxiliary shaft 118 rotate together at the same speed. The auxiliary shaft 118 extends through a portion of the gear housing 106 and includes an attachment end 120. Various components may be attached to the attachment end 120 of the auxiliary shaft 118 to receive torque from the auxiliary shaft 118. Such components may include, for instance, a hydraulic pump, a generator, a power takeoff shaft, some combination thereof, or the like. The auxiliary shaft 118 is also coupled to a second clutch portion 122 of the clutch assembly 112. The second clutch portion 122 rotates with the auxiliary shaft 118 and, therefore, due to the engine 104.

With continued reference to FIG. 3, the first clutch portion 114 is shown coupled to an input shaft 124. The input shaft 124 extends into the gear housing 106 and drives a gear assembly 126 (shown schematically) located in the gear housing 106. The input shaft 124 rotates with the first clutch portion 114. The input shaft 124, according to the illustrated embodiment in FIG. 3, is a hollow shaft surrounding the auxiliary shaft 118. In this embodiment, the input shaft 124 and the auxiliary shaft 118 are concentric and may be spaced apart by, for instance, bearings, lubricant, some combination thereof, or the like.

With continued reference to FIG. 3, the gear assembly 126 transmits the torque received from one or both of the engine 104 and the electric motor 108 to an output shaft 128. The output shaft 128 is rotated by the gear assembly 126 and transfers the torque received therefrom to, for instance, a driveshaft, wheel, or the like of the work vehicle 100.

Figure 4:
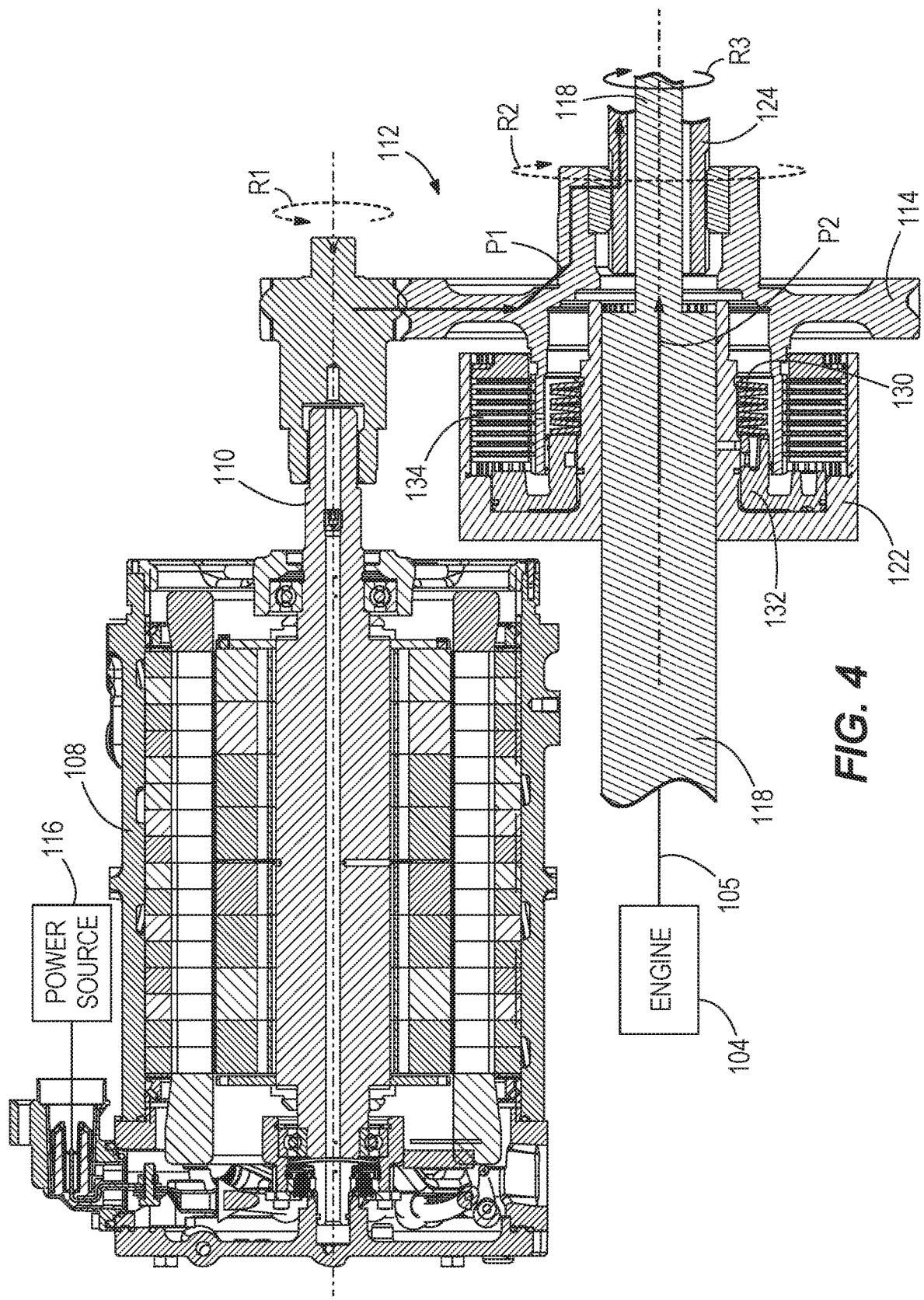
FIG. 4 is a detailed cross-sectional elevation view of the electric motor and clutch assembly shown in FIG. 3 with the clutch assembly in the disengaged position.

With reference to FIG. 4, the clutch assembly 112 is shown in a disengaged position. In the disengaged position, the clutch assembly 112 transfers torque received from the electric motor shaft 110 of the electric motor 108 to the input shaft 124. This force transfer is shown with a first pathway P1. The rotation of the electric motor shaft 110 due to torque in a first rotational direction R1 causes the first clutch portion 114 to rotate due to torque in a second rotational direction R2, which causes the input shaft 124 to also rotate due to torque in the second rotational direction R2. Because the clutch assembly 112 is disengaged, the engine 104 does not transfer torque to the input shaft 124. With the clutch assembly 112 in the disengaged position, however, the auxiliary shaft 118 continues to receive torque transferred from the engine shaft 105 of the engine 104. This force transfer is shown with a second pathway P2. The second clutch portion 122 simply rotates freely with the auxiliary shaft 118 relative to the first clutch portion 114 due to torque in a third rotational direction R3 in this configuration.

With continued reference to FIG. 4, the clutch assembly 112 further includes a plurality of resilient members 130. The resilient members 130 bias the clutch assembly 112 toward the disengaged position. In the illustrated embodiment, the resilient members 130 are in the form of a plurality of Belleville washers. Specifically, the resilient members 130 bias an axial clutch engagement member 132 of the clutch assembly 112 in the left direction on the page in FIG. 4. This disengaged position of the clutch assembly 112 allows the plurality of clutch plates 134 to rotate past each other freely.

Figure 5:
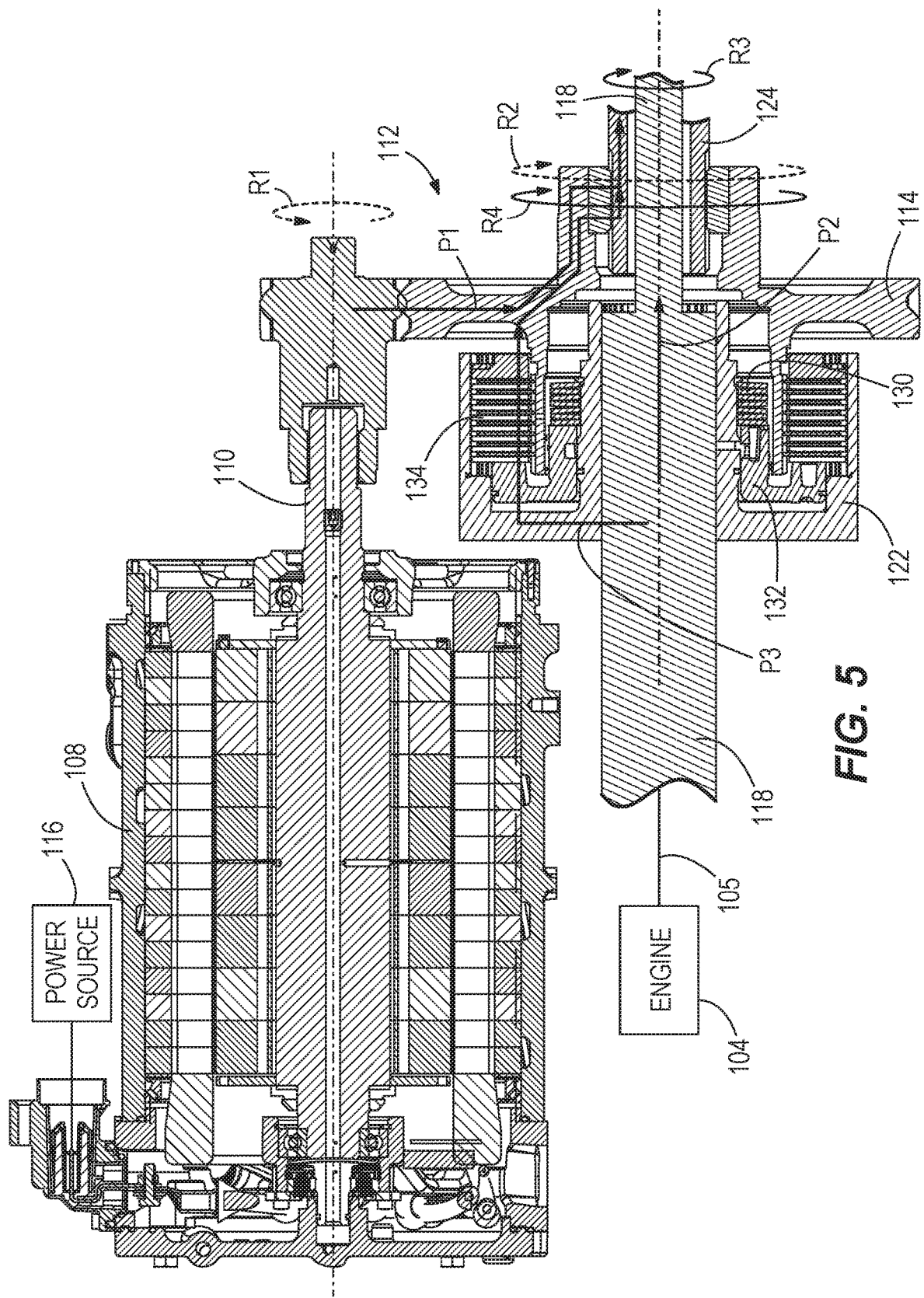
FIG. 5 is a detailed cross-sectional elevation view of the electric motor and clutch assembly shown in FIG. 3 with the clutch assembly in the engaged position and the electric motor in the force production state.

With reference to FIG. 5, the clutch assembly 112 is shown in an engaged position. In the engaged position, the clutch assembly 112 transfers torque received from one or both of the engine shaft 105 of the engine 104 and the electric motor shaft 110 of the electric motor 108 to the input shaft 124. In FIG. 5, both the engine 104 and the electric motor 108 transfer torque to the input shaft 124. The force transfer from the engine shaft 105 to the input shaft 124 is shown with a third pathway P3. The force transfer from the electric motor shaft 110 to the input shaft 124 is shown with the first pathway P1. With the clutch assembly 112 in the engaged position, the axial clutch engagement member 132 is forced against the biasing influence of the resilient members 130 to compress the clutch plates 134 into engagement with each other, thereby allowing for the transfer of at least some of the torque from the engine shaft 105 to the input shaft 124. The input shaft 124 rotates due to torque in a fourth rotational direction R4 due to this torque from the engine shaft 105.

Figure 6:
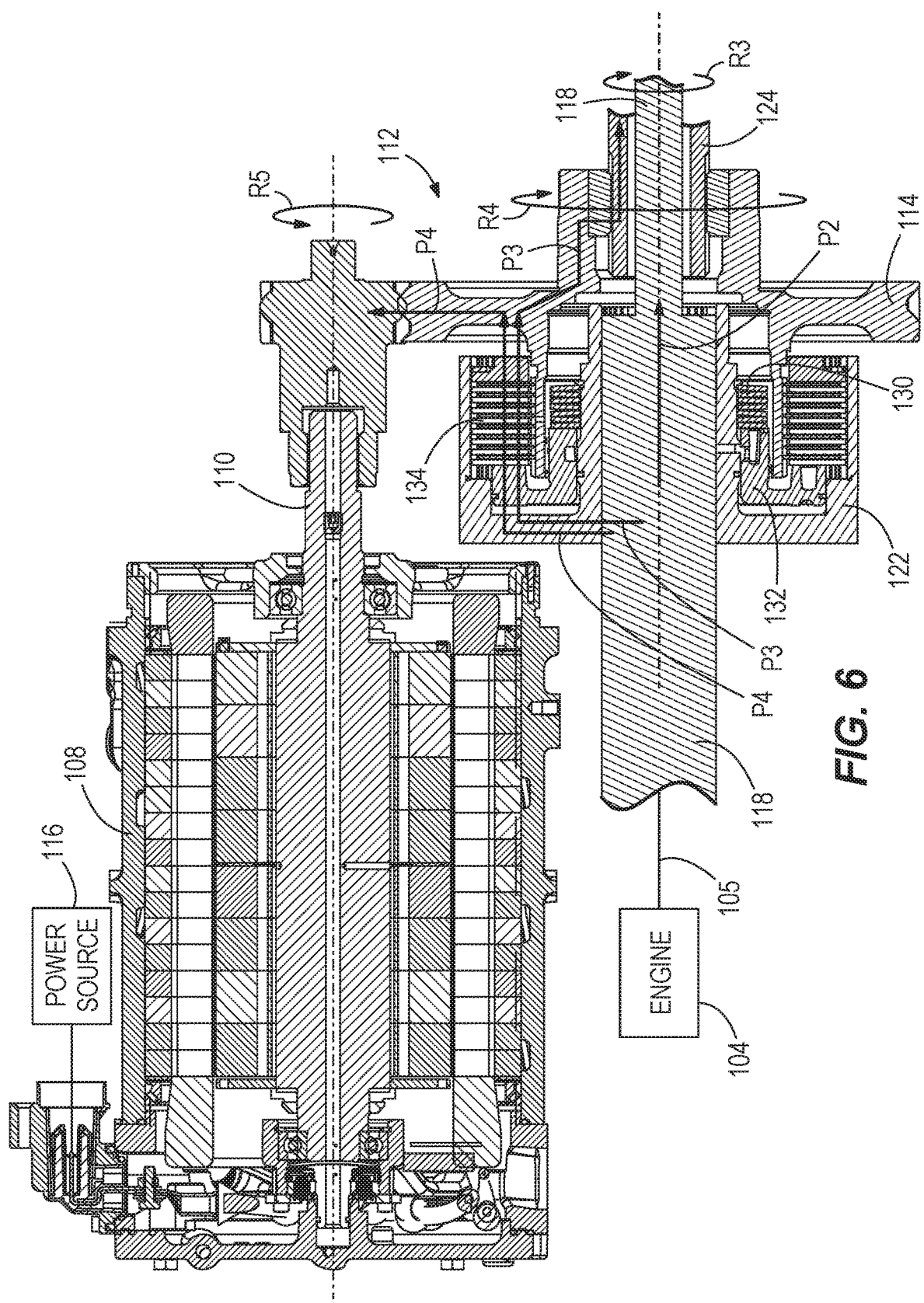
FIG. 6 is a detailed cross-sectional elevation view of the electric motor and clutch assembly shown in FIG. 3 with the clutch assembly in the engaged position and the electric motor in the electrical power generation state.

With reference to FIG. 6, the clutch assembly 112 is again shown in the engaged position. In this configuration, however, the electric motor 108 is not producing a force in the form of torque via the electric motor shaft 110. Instead, the electric motor shaft 110 is receiving torque from the first clutch portion 114 of the clutch assembly 112. This torque is introduced from the engine 104 as described above with regard to FIG. 5. The force transfer from the engine shaft 105 to the input shaft 124 is again shown with the third pathway P3. The force transfer from the engine shaft 105 to the electric motor shaft 110 is shown with a fourth pathway P4. This force transfer causes the electric motor shaft 110 to rotate due to torque in a fifth rotational direction R5. In this configuration, the circuitry connecting the electric motor 108 to the power source 116 allows the electric motor 108 to act as a generator and recharge the power source 116.

After reviewing FIGS. 4-6, one understands the input shaft 124 rotates at substantially the same time as the electric motor shaft 105 regardless of whether the clutch assembly 112 is in the engaged position with the electric motor 108 in an electrical power generation state (FIG. 6), in the engaged position with the electric motor 108 in a force production state (FIG. 5), or in the disengaged position (FIG. 4). One also understands the auxiliary shaft 118 rotates at substantially the same time as the engine shaft 105 regardless of whether the clutch assembly 112 is in the engaged position (FIGS. 5 and 6) or in the disengaged position (FIG. 4). Finally, one also understands the input shaft 124 rotates at substantially the same time as the engine shaft 105 in the engaged position (FIGS. 5 and 6), but not in the disengaged position (FIG. 4).

Figure 7:
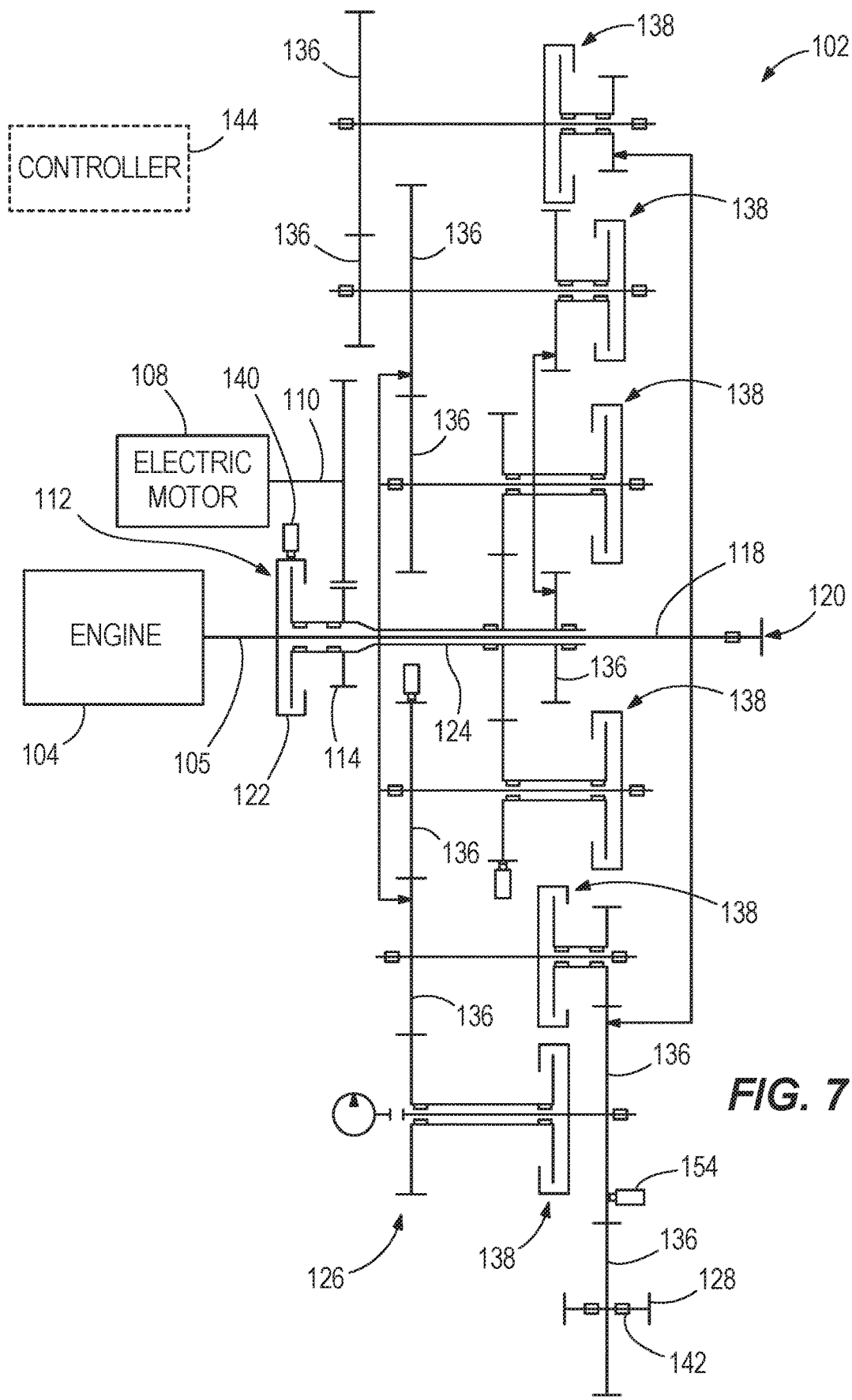
FIG. 7 is a schematic representation of the power shift transmission of FIG. 2.
Figure 8:
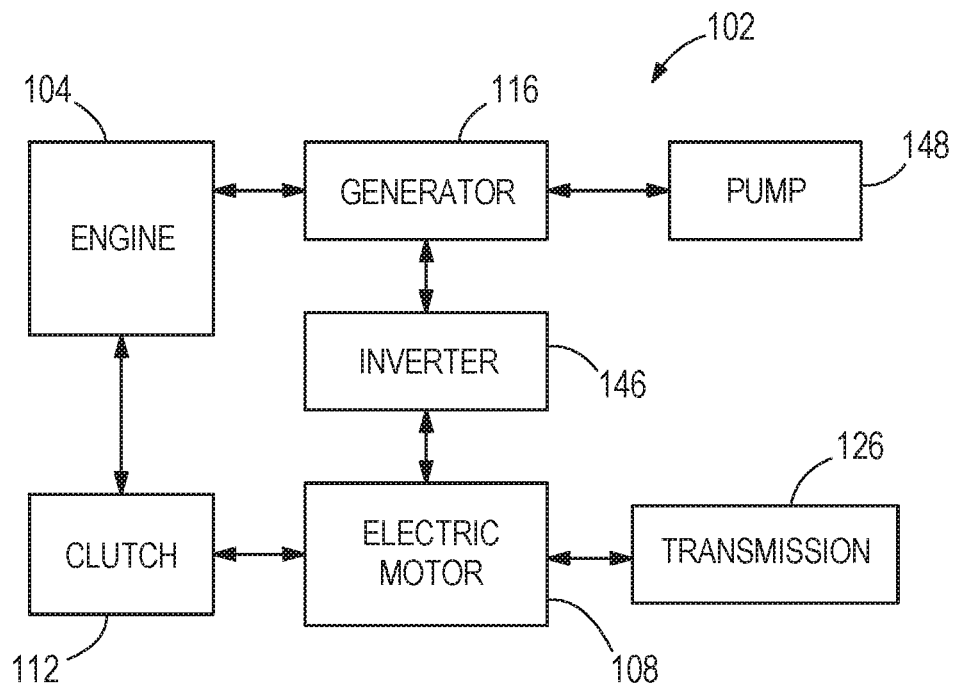
FIG. 8 is a block diagram schematically representing the connections of various components of a power shift transmission according to an embodiment of the disclosure.
Figure 9:
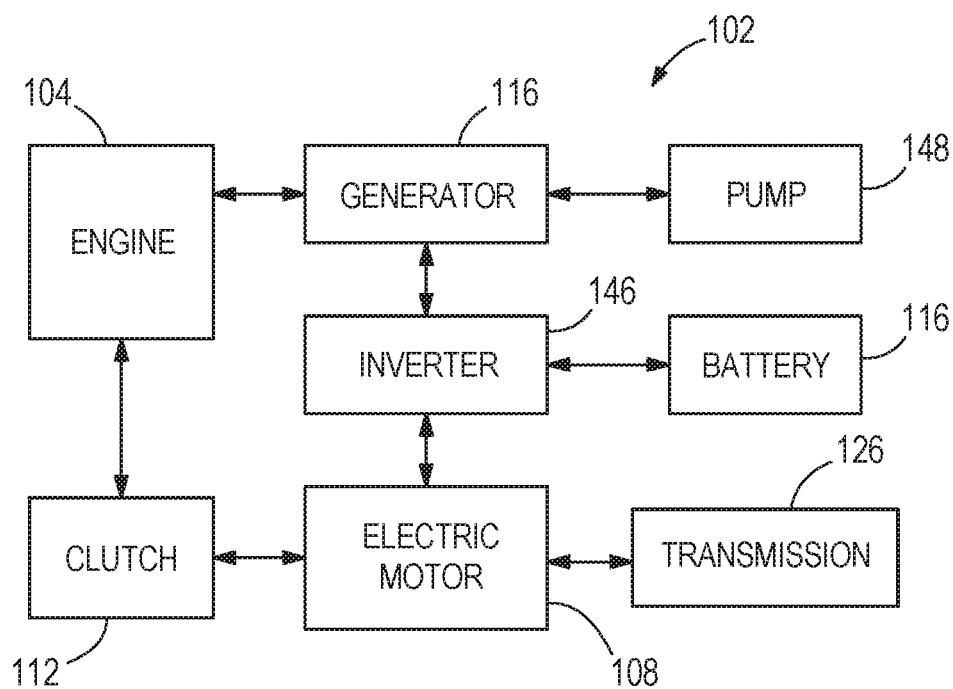
FIG. 9 is a block diagram schematically representing the connections of various components of a power shift transmission according to another embodiment of the disclosure.

With reference to FIG. 7, a schematic representation of the power shift transmission 102 is shown. The gear assembly 126 of the power shift transmission 102 includes a plurality of gears 136. The illustrated embodiment of the power shift transmission 102 also includes a plurality of clutch assemblies 138 to operate the gear assembly 126 in a variety of ways including, for instance, a forward mode, a reverse mode, a low gear setting, a high gear setting, an idle electrical power generation setting (with the engine shaft 105 transferring torque to the electric motor shaft 110 while no torque is transferred to the output shaft 128), or the like. The power shift transmission 102 is further illustrated as including an engine shaft output speed sensor 140. This sensor 140 may be associated with the engine shaft 105, the auxiliary shaft 118, the second clutch portion 122 (as illustrated), some combination thereof, or the like. The power shift transmission 102 is also illustrated as including a torque load sensor 142. This sensor 142 may be associated with the output shaft 128 (as illustrated), the input shaft 124, one or more of the gears 136, some combination thereof, or the like. Any number and combination of different additional sensors may be included in various embodiments. Further still, the power shift transmission 102 is illustrated as including a controller 144. The controller 144 receives input signals from sensors such as the engine shaft output speed sensor 140, the torque load sensor 142, or the like. The controller 144 also outputs control signals to components of the power shift transmission 102 such as the clutch assembly 112, the clutch assemblies 138 of the gear assembly 126, the circuitry electrically coupling the electric motor 108 and the power source 116, a hydraulic pump, or the like. For instance, the controller 144 may control a hydraulic pump to hydraulically actuate the clutch assembly 112. Other embodiments may include the controller 144 actuating a solenoid or other switch to actuate the clutch assembly 112. The controller 144 may include, for instance, a look-up table. The controller 144 may compare the input signals from the sensors to corresponding values in the look-up table and control components of the power shift transmission 102 accordingly.

FIGS. 8-12 schematically illustrate embodiments of the power shift transmission 102 including various components in various configurations. The components included in this embodiments include the components discussed above with regard to FIGS. 1-7. Additional optional components to be included in the power shift transmission 102 include, but are not limited to, an inverter 146 to alter the nature of the electricity transferred between components, a pump 148 (such as a hydraulic pump to move components via a hydraulic system), a generator and/or battery (power sources 116) to power the pump 148 and/or the electric motor 108, a variator 150 to continuously change its gear ratio between the gear assembly 126 and one or both of the engine 104 and the electric motor 110, a torque converter (e.g., a lock-up torque converter) 152, or the like.

Many of the embodiments discussed herein have various functionality actuated with or without the use of a controller 144. Some embodiments include the clutch assembly 112 being in the engaged position if the torque required by the output shaft 128 is below a torque threshold value. Stated another way, the clutch assembly 112 is in the engaged position if the torque sensed by the torque load sensor 142 is below a torque threshold value. Some embodiments also include the clutch assembly 112 in the disengaged position if the torque required by the output shaft 128 (or the torque sensed by the torque load sensor 142) is above the torque threshold value.

Some embodiments include the clutch assembly 112 being in the engaged position and the electric motor 108 being in a force production state (transmitting force instead of receiving force to generate electrical power) if the torque required by the output shaft 128 (or the torque sensed by the torque load sensor 142) is above a torque threshold value and the rotational speed of the output shaft (or the rotational speed sensed by the output shaft speed sensor 154) is above a speed threshold value. Some embodiments also include the clutch assembly 112 being in the engaged position and the electric motor 108 being in an electrical power generation state (generating electrical power instead of transmitting force) if the torque required by the output shaft 128 (or the torque sensed by the torque load sensor 142) is below a torque threshold value and the rotational speed of the output shaft (or the rotational speed sensed by the output shaft speed sensor 154) is above a speed threshold value.

Some embodiments further include the clutch assembly 112 being in the disengaged position if the torque required by the output shaft 128 (or the torque sensed by the torque load sensor 142) is above a torque threshold value and the rotational speed of the output shaft (or the rotational speed sensed by the output shaft speed sensor 154) is below a speed threshold value.

Some embodiments also include the clutch assembly 112 being in the engaged position with the electric motor 108 in an electrical power generation state if one or both of the output shaft 128 and the input shaft 124 is disengaged from the gear assembly 126 while the engine 104 is running due to, for instance, one or more of the clutch assemblies 138 of the gear assembly 126. This mode could be understood as a recharging mode for the power source 116, since the engine 104 causes the electric motor 108 to produce electricity that is used to recharge the power source 116.

In many of the above disclosed embodiments, the engine 104 is allowed to operate at varying speeds, whether dependent on the acceleration command received from an operator (e.g., pressing an accelerator pedal) or dependent on fluctuations in engine output. Many of the embodiments discussed above do not require the engine 104 to rotate the engine shaft 105 at a substantially constant speed.

Although particular independent embodiments have been described above, the above disclosure is not to be interpreted as limiting to the disclosed embodiments. A person having ordinary skill in the art, with the knowledge of this disclosure, may contemplate various alternative embodiments or additional features to disclosed embodiments that should be considered within the scope of the current disclosure. Additionally, one or more elements of one embodiment may be combined with elements of other embodiment(s) to create a new additional embodiment.

One or more features and/or advantages of the disclosure may be set forth in the following claims.

What is claimed is:

1. A power shift transmission comprising:
an input shaft;
a gear housing including a gear assembly disposed therein, the gear assembly configured to be driven by the input shaft;
an output shaft configured to be rotated by the gear assembly;
an auxiliary shaft extending through a portion of the gear housing, the auxiliary shaft configured to be rotated by an internal combustion engine;
a clutch assembly movable from a disengaged position to an engaged position, the clutch assembly including
a first clutch portion coupled to the input shaft; and
a second clutch portion coupled to the auxiliary shaft, the second clutch portion configured to transmit rotational force to the first clutch portion only with the clutch assembly in the engaged position;
an electric motor including an electric motor shaft in geared relationship with the first clutch portion; and
wherein the auxiliary shaft is configured to be rotated by the internal combustion engine regardless of whether the clutch assembly is in the engaged position or the disengaged position.

2. The power shift transmission of claim 1, wherein the input shaft and the auxiliary shaft are concentric; and at least a portion of the auxiliary shaft is surrounded by the input shaft.

3. The power shift transmission of claim 1, further comprising
the internal combustion engine including an engine shaft; and
wherein the auxiliary shaft is coupled to the engine shaft such that the auxiliary shaft and the engine shaft rotate at the same speed.

4. The power shift transmission of claim 1, wherein the clutch assembly further includes at least one resilient member configured to bias the clutch assembly toward the disengaged position.

5. The power shift transmission of claim 1, further comprising
a power takeoff shaft configured to be rotated by the auxiliary shaft.

6. The power shift transmission of claim 1, further comprising
a hydraulic pump configured to be driven by the auxiliary shaft.

7. The power shift transmission of claim 6, further comprising
a generator configured to be driven by the auxiliary shaft;
a power inverter electrically coupled with the generator; and
wherein the electric motor is electrically coupled with the power inverter.

8. The power shift transmission of claim 1, further comprising
a power inverter electrically coupled with the electric motor; and
a battery electrically coupled with the power inverter.

9. The power shift transmission of claim 8, further comprising
a generator configured to be driven by the auxiliary shaft; and
wherein the power inverter is electrically coupled with the generator.

10. The power shift transmission of claim 1, wherein the clutch assembly includes a hydraulically actuated clutch engagement member.

11. The power shift transmission of claim 1, further comprising
a work vehicle including the power shift transmission.

12. A power shift transmission comprising:
an input shaft
a gear assembly configured to be driven by the input shaft;
an output shaft configured to be rotated by the gear assembly;
a clutch assembly coupled to the input shaft, the clutch assembly movable from a disengaged position to an engaged position;
an electric motor including an electric motor shaft in geared relationship with the clutch assembly such that, both with the clutch assembly in the disengaged position and with the clutch assembly in the engaged position, the electric motor shaft rotates with the input shaft;
an internal combustion engine including an engine shaft configured to rotate the input shaft only with the clutch assembly in the engaged position; and
a controller configured to
move the clutch assembly to the disengaged position if a required torque output of the output shaft is above a torque threshold value; and
move the clutch assembly to the engaged position if a required torque output of the output shaft is below the torque threshold value.

13. A power shift transmission comprising:
an input shaft;
a gear assembly configured to be driven by the input shaft;
an output shaft configured to be rotated by the gear assembly;
a clutch assembly coupled to the input shaft, the clutch assembly movable from a disengaged position to an engaged position;
an electric motor including an electric motor shaft in geared relationship with the clutch assembly such that, both with the clutch assembly in the disengaged position and with the clutch assembly in the engaged position, the electric motor shaft rotates with the input shaft;
an internal combustion engine including an engine shaft configured to rotate the input shaft only with the clutch assembly in the engaged position; and
a controller configured to
move the clutch assembly to the engaged position and place the electric motor in a force-production state if a required torque output of the output shaft is above a torque threshold value and a rotational speed of the output shaft is above a speed threshold value, and
move the clutch assembly to the engaged position and place the electric motor in an electrical power-generation state if a required torque output of the output shaft is below the torque threshold value and a rotational speed of the output shaft is above the speed threshold value.

14. The power shift transmission of claim 13, wherein the controller is further configured to move the clutch assembly to the disengaged position if a required torque output of the output shaft is above the torque threshold value and a rotational speed of the output shaft is below the speed threshold value.

15. A power shift transmission comprising:
an input shaft;
a gear assembly configured to be driven by the input shaft;
an output shaft configured to be rotated by the gear assembly;
a clutch assembly coupled to the input shaft, the clutch assembly movable from a disengaged position to an engaged position;
an electric motor including an electric motor shaft in geared relationship with the clutch assembly such that, both with the clutch assembly in the disengaged position and with the clutch assembly in the engaged position, the electric motor shaft rotates with the input shaft;
an internal combustion engine including an engine shaft configured to rotate the input shaft only with the clutch assembly in the engaged position; and
a controller configured to
move the clutch assembly to the engaged position and place the electric motor in an electrical power-generation state if the output shaft is disengaged from the gear assembly and the internal combustion engine is running.

16. The power shift transmission of claim 12, wherein the internal combustion engine is configured to be operated at varying speeds.

17. The power shift transmission of claim 12, further comprising
a rotational speed sensor configured to detect the rotational speed of the engine shaft;
a torque sensor configured to detect the torque experienced by the output shaft; and wherein
the controller receives input signals from the rotational speed sensor and the torque sensor,
the clutch assembly is hydraulically actuated, and
the controller outputs control signals to move the clutch assembly from the disengaged position to the engaged position and from the engaged position to the disengaged position.

18. The power shift transmission of claim 13, further comprising
a rotational speed sensor configured to detect the rotational speed of the engine shaft;
a torque sensor configured to detect the torque experienced by the output shaft; and
wherein
the controller receives input signals from the rotational speed sensor and the torque sensor,
the clutch assembly is hydraulically actuated, and
the controller outputs control signals to move the clutch assembly from the disengaged position to the engaged position and from the engaged position to the disengaged position.

19. The power shift transmission of claim 15, further comprising
a rotational speed sensor configured to detect the rotational speed of the engine shaft;
a torque sensor configured to detect the torque experienced by the output shaft; and
wherein
the controller receives input signals from the rotational speed sensor and the torque sensor,
the clutch assembly is hydraulically actuated, and
the controller outputs control signals to move the clutch assembly from the disengaged position to the engaged position and from the engaged position to the disengaged position.

\* \* \* \* \*